Dec. 23, 1952 — W. W. CHEW — 2,622,698
LUBRICANT DISTRIBUTION SYSTEM
Filed May 22, 1951
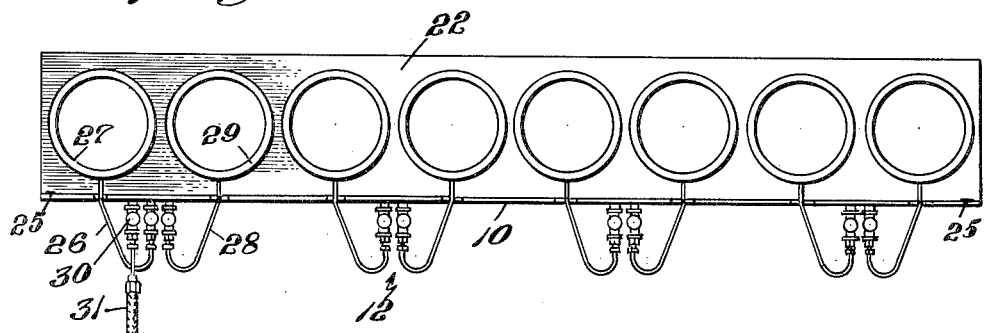
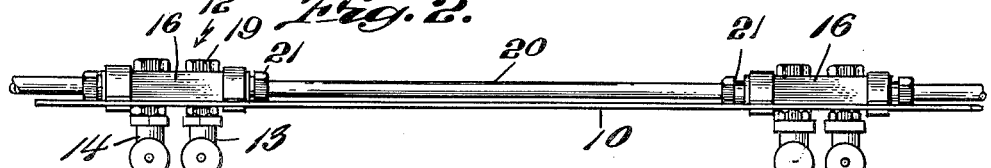
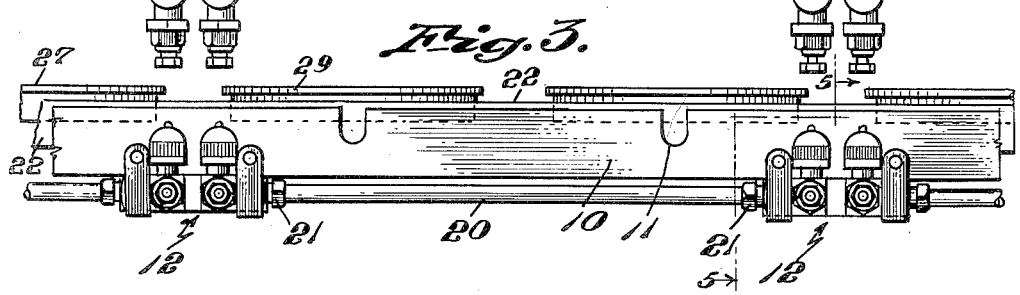
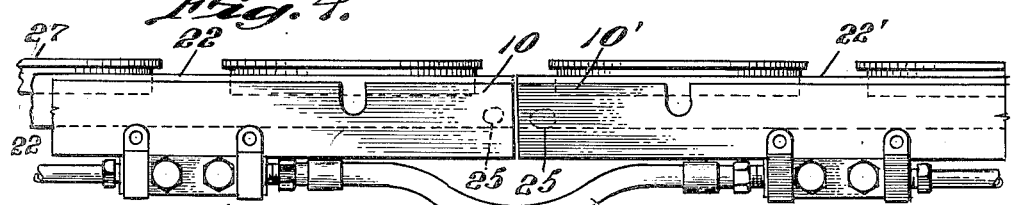
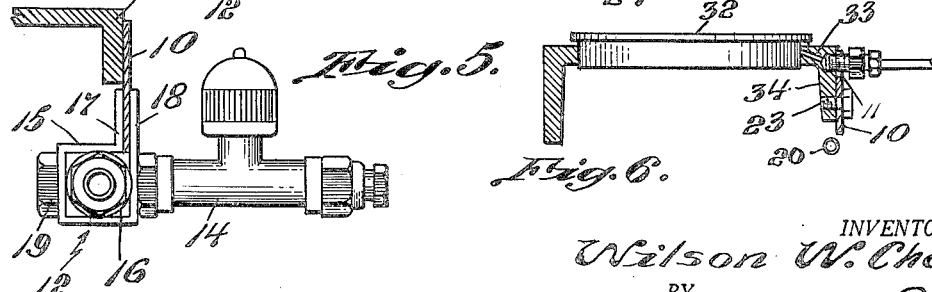
INVENTOR.
Wilson W. Chew
BY Barlow & Barlow
ATTORNEYS.

Patented Dec. 23, 1952

2,622,698

UNITED STATES PATENT OFFICE 2,622,698

LUBRICANT DISTRIBUTION SYSTEM

Wilson W. Chew, Barrington, R. I.

Application May 22, 1951, Serial No. 227,696

5 Claims. (Cl. 184—7)

This invention relates to a machine, for example, a spinner or twister frame, and particularly to the lubrication of the rings of the frame.

So-called centralized lubrication systems to eliminate the necessity of manual lubrication are used on spinner and twister frames. This requires the installation of injectors usually in pairs on the rail and then connecting the injectors to openings in the rail or openings in the ring and the connecting of the injectors one with the other and the end injectors to a source of lubricant under pressure. The ring rail is taken off of the frame for ease in such assembly. There is a considerable amount of piping necessary for such an installation and it usually requires several days for the converting of a spinner or twister frame for this type of lubrication, which is a loss of time of productive hours of the frame during such installation. Because of this drawback, there have been many who have refrained from such installation.

One of the objects of this invention is to speed up the installation of such equipment on a spinner or twister frame.

Another object of the invention is to provide for testing of a large number of the joints which are required to be made prior to installation on the frame so that should any leaks occur, these may be corrected before installation on the frame, thus reducing the possibility of leaks at the time of assembly on the frame.

Another object of the invention is to prefabricate a large part of the mechanism and then assemble this prefabricated part with the frame in a minimum amount of time.

Another object of this invention is to provide a strip member or strip which will hold the number of injectors required for one section of the frame so that this may be assembled on the ring rail by a few bolts and nuts or by welding without detaching the ring rail from the frame.

With these and other objects in view, the invention consists of certain novel features of construction, as will be more fully described and particularly pointed out in the appended claims.

In the accompanying drawings:

Figure 1 is a top plan view of a ring rail equipped with this invention;

Figure 2 is a top plan view on a larger scale of a portion of strip member with injectors assembled thereon looking in the same direction as shown in Figure 1 but omitting the ring rail;

Figure 3 is an elevation of the showing in Figure 2 with the strip member attached to the ring rail prior to connecting of the conduits to the rings;

Figure 4 is a view similar to Figure 3 but illustrating the end portions of two adjacent sections of ring rails and strip members;

Figure 5 is a sectional view on substantially line 5—5 of Figure 3 illustrating a portion of the ring rail to show its relation to the strip member; and Figure 6 is a sectional view showing the ring rail with rings of modified form thereon and the connection to the ring differing from the connection to the rings in Figure 1.

In proceeding with this invention, I take a flat strip of stock of substantially the length of one of the sections of a ring rail and mount upon this strip of stock a plurality of injectors one for each of the rings in the section. These injectors may be mounted either singly or in multiple. Usually these injectors are in pairs and one pair will be located halfway between two rings; the next pair will be located halfway between the next pair of rings, and so forth, there usually being eight or ten rings to a rail section and, accordingly, I have at least the same number of injectors on the strip of stock which I utilize. The injectors are connected one with the other by a tube which serves to convey the lubricant from a source of supply to each of the injectors. Then, I assemble this strip member with the ring rail while the ring rail is in place on the frame, making unnecessary any change in adjustment of the ring rail on the frame, which would be necessary were the ring rail removed and replaced. After this assembly is made, the simpler operation of connecting each injector to a ring is done by a conduit from the injector to the ring, either over the upper edge at the back of the rail, as I have shown in Figure 1, or through the flange of the rail into the ring, as I have illustrated in Figure 6. The installation is then complete except for the connection to the source of lubricant supply under high pressure such, for instance, as three thousand pounds per square inch, all of which is connected with clock work for injections at certain time intervals.

With reference to the drawings, 10 designates a strip of stock which will be selected as about an inch wide and one-sixteenth to one-eighth of an inch in thickness, depending upon the rigidity required and the material utilized. In cases where the strip member is to be utilized for rings which have their lubricant entrance above the upper surface of the rail, no further operation need be provided, but in cases where the entrance is through the flange of the ring rail, openings or notches as 11 will be provided for the reception of the conduits from the injectors.

I will then mount upon this strip member, injectors in pairs as designated at 12, there being shown two injectors 13 and 14 in each pair which are mounted upon the strip 10 by a loop or brake 15 (see Figure 5) which extends loosely about the square body portion 16 of the injector 12 with one ear 17 on one side of the strip and the other ear 18 on the other side of the strip, in which position these ears are secured by any suitable means such, for instance, as by welding. As each of the injectors 13 and 14 are assembled on the body 16 by means of a screw 19, by removing this screw the injectors may be detached and the body 16 may be slid through the loops for replacement if desired. These pairs of injectors 12 are then connected by conduits 20 as at 21 at either end so that the lubricant may be conveyed from some suitable source to each unit of injectors on the strip. The assembly will be tested for leaks of the connections between the injector units. This prefabricated assembly of strip member and injectors which will be pre-designed for rings of certain size and therefore certain distances apart will then be assembled upon the ring rail 22 in such location that the injector units 12 are halfway between each pair of rings on the section, as shown in Figure 1. This assembly on the ring rail will be by bolting the strip member to the ring rail as at 23 or by welding 25, if it is considered that detachment unnecessary.

A similar strip member 10', as shown in Figure 4, will be connected to the next ring rail section 22'; then in order to connect two of the prefabricated assemblies together, a hose connection 24 may be utilized as shown in Figure 4, thus connecting all of the strip member assemblies together after installed upon the ring rail. The end section will be connected to a central source of supply for injection of lubricant under pressure and at suitable timed intervals.

Each injector is connected to its ring such, for instance, as shown in Figure 1, the connection 26 being connected to the ring 27 of one pair, while the connection of the other injector 13 is by conduit 28 to its ring 29. A third injector may be utilized as at 30 for connection to the lift rod by a connection 31. In each of these cases shown in Figure 1, the conduit extends over the top of the ring rail to the ring.

In some cases, however, the ring 32 sits down into the rail so that it is lubricated through the rail below the upper surface of the rail, and in this case a conduit 33 extends through the rail or flange 34 of the ring rail with the injector tube extending through the notch 11 of the bracket for entrance to the ring.

In all cases it will be noted that the conduits 20 are beneath the flange of the ring rail which makes for economy of space. The connections from the injectors to the rail are at the back of the rail and thus in a protected position.

By this prefabricated assembly of injectors on a strip member, testing of the connections between injectors where leaks are possible may all take place prior to assembly on the spinning frame and may then be assembled on the spinning frame in a minimum length of time without removing the rail from the frame. Connections to the rings from the injectors may be then made easily and the spinning frame is out of operation for a minimum length of time.

It will be understood that this lubricating system may be applied to many machines, ring spinner or twister frame being merely illustrative of an application thereof.

I claim:

1. In a system of lubricant distribution of the class wherein a plurality of injectors are located at spaced intervals along the machine adjacent the points to be lubricated, said injectors being connected by lubricant conduits of substantial length, that improvement which comprises strip members, each attached to the machine and of a length to extend the distance that said plurality of points to be lubricated are spaced, each strip member carrying a plurality of the injectors in spaced relation with one injector adjacent each point of lubrication, conduits connecting said injectors to provide an integral unit section of the system whereby each unit section may be prefabricated and pretested on the strip member and the strip member thereafter secured to the machine to in one step mount a plurality of connected injectors in position.

2. In a system as in claim 1 wherein screw means attaches each strip member to the machine.

3. In a system as in claim 1 wherein a conduit connects each injector with each point of use and the strip member is provided with an opening through which the conduit to the point of use passes.

4. In a system as in claim 1 wherein brackets are attached to the strip member and slidably carry the injectors.

5. In a system of lubricant distribution of the class wherein a plurality of injectors are located at spaced intervals along the ring rail of a spinner or twister frame adjacent the rings to be lubricated, said injectors being connected by lubricant conduits of substantial length, that improvement which comprises strip members, each attached to the ring rail and of a length to extend the distance that said plurality of rings to be lubricated are spaced, each strip member carrying a plurality of the injectors in spaced relation with one injector adjacent each ring to be lubricated, conduits connecting said injectors to provide an integral unit section of the system whereby each unit section may be prefabricated and pretested on the strip member and the strip member thereafter secured to the ring rail to in one step mount a plurality of connected injectors in position.

WILSON W. CHEW.

REFERENCES CITED

The following references are of record in the file of this patent:

UNITED STATES PATENTS

| Number | Name | Date |
| --- | --- | --- |
| 1,639,749 | Pierce | Aug. 23, 1927 |
| 1,881,532 | Hanson | Oct. 11, 1932 |
| 1,891,647 | Manzel | Dec. 20, 1932 |
| 1,968,044 | Kocher | July 31, 1934 |
| 2,186,185 | Walker | Jan. 9, 1940 |
| 2,229,655 | Kocher | Jan. 28, 1941 |
| 2,478,022 | Sugden | Aug. 2, 1949 |
| 2,478,031 | Visser | Aug. 2, 1949 |

FOREIGN PATENTS

| Number | Country | Date |
| --- | --- | --- |
| 533,302 | Germany | Sept. 11, 1931 |